Figure 2:
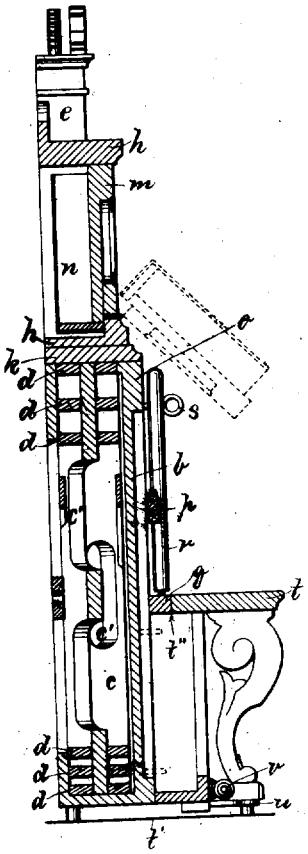

G. WOODS.

Piano Case.

No. 9,412. Reissued Oct. 12, 1880.

Witnesses:

Henry Chadbourn

John H. Foster

Inventor:

George Woods by Ethan Allen Andrews his atty.

G. WOODS.

Piano Case.

No. 9,412. Reissued Oct. 12, 1880.

Witnesses:

Henry Chadbourn.

John H. Foster

Inventor:

George Woods.

by Alban Andrén his atty.

UNITED STATES PATENT OFFICE.

GEORGE WOODS, OF CAMBRIDGEPORT, MASSACHUSETTS.

PIANO-CASE.

SPECIFICATION forming part of Reissued Letters Patent No. 9,412, dated October 12, 1880.

Original No. 200,850, dated March 5, 1878. Application for reissue filed July 6, 1880.

*To all whom it may concern:*

Be it known that I, GEORGE WOODS, of Cambridgeport, in the county of Middlesex and State of Massachusetts, have invented certain new and useful Improvements in Piano Cases and Frames; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in piano cases and frames; and it consists, first, in the employment of a corrugated frame made in the shape of several V's joined together, which parts are tongued and grooved properly together lengthwise, and provided in the upper and lower end with V-shaped braces, by which the said frame is made very firm and durable.

Perforations of suitable size and shape are made through the corrugated frame, so as to admit the free and unobstructed undulations of the sound-waves behind the sounding-board. To the front of this improved frame is secured the sounding-board.

The aforesaid corrugated frame, by its peculiar construction, will allow of lateral expansion or contraction without injury to the case or other parts, but is made unyielding and exceedingly strong in the direction of the strings of the instrument, or nearly so, and the perforations in the said frame make it very light in proportion to its great strength.

My invention further consists in the arrangement of hinged music-receptacles above the main case of the instrument. Each of said receptacles consists of a plate or door hinged in its lower end to a frame detachable from the central pipe-rack by means of screws or similar fastenings, so that the whole of the top above the main case can be taken apart and be packed properly in a very reduced compass. To the inside of each of said hinged doors or plates is secured a box, open at its upper end, which box serves as a receptacle for music, &c., that is easily accessible when the hinged door is swung forward toward the player, and it may be swung forward far enough to allow sheet or book music, &c., to drop out by its own weight, if so desired. When the sheet or book music is not required for use it is placed in the receptacle, which is then turned around its hinges to an upright position, in which position it will be automatically retained without the need of any locking device, on account of the center of gravity of the books or sheets and receptacle coming inside of the fulcrum, around which they are swung and supported.

My invention finally consists of an improved foot-guard provided with projections by which it is kept a proper distance from the case, to prevent the feet of the player from defacing and injuring the case of the instrument, and which foot-guard is secured to the case by means of suitable screws.

Figure 1:
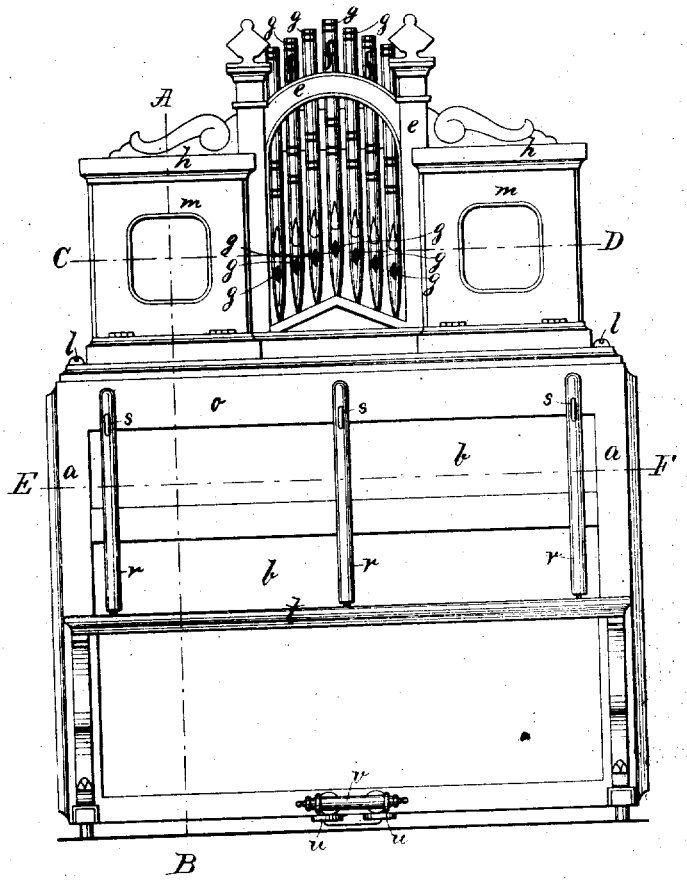
Figure 3:
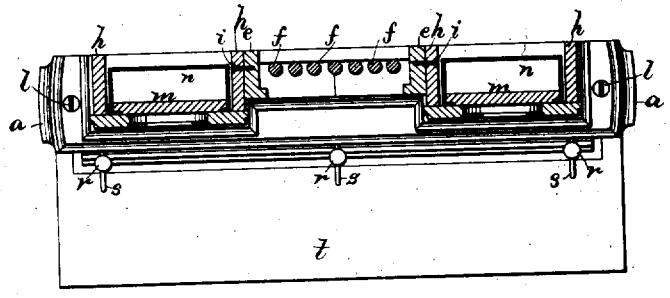
Figure 4:
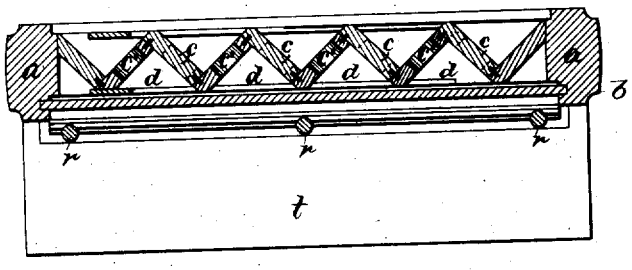
Figure 5:
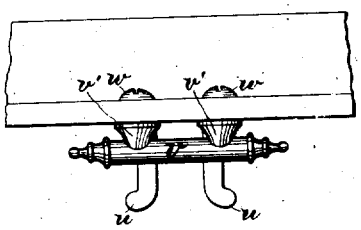

On the accompanying drawings, Figure 1 represents a front elevation of my invention. Fig. 2 represents a vertical section on the line A B, shown in Fig. 1. Fig. 3 represents a cross-section on the line C D, shown in Fig. 1, and Fig. 4 represents a cross-section on the line E F, also shown in Fig. 1. Fig. 5 represents a plan view of the foot guard or protector.

Similar letters refer to similar parts wherever they occur on the different parts of the drawings.

*a a* represent the uprights of the case, and *b* represents the sounding-board. Between the uprights *a a* and behind the sounding-board *b* is located the corrugated frame that is composed of the boards *c c c*, tongued together, as shown in Fig. 4, and provided with perforations *c' c' c'*, (shown in Figs. 2 and 4,) for the purpose set forth.

*d d d* represent V-shaped braces in the upper and lower ends of the corrugated frame *c c c*, which braces are secured to the frame with glue, or in a similar manner, by which the relative positions of the different parts of the frame *c c c* are fully retained, as shown.

*e* represents the ornamental pipe-frame above the main frame of the piano, in which the ornamental organ-pipes *f f f* are located, as shown in Figs. 1 and 3. To each side of the pipe-frame *e* is secured a frame, *h h*, by means of suitable screws *i i*, Fig. 3, and in this manner the said frames *h h* can easily be detached from the pipe-frame *e*, as may be required, so as to pack within a small compass. The frame *e* is secured, by means of screws or otherwise, to the plate *k*, that is fastened to the top of the piano-case by means of screws *l l*, as shown in Figs. 1 and 3. Each of the open frames *h h* is provided with a plate or cover, *m m*, that is hinged in its lower end to each of the frames *h h*, as shown in Figs. 1 and 2.

*n n* represent the receptacles for book or sheet music, which receptacles are respectively secured to the inside of each of the hinged plates or covers *m m*. The boxes *n n* are open in their upper ends and closed at the bottom, and their position, when folded outward, is fully shown in dotted lines in Fig. 2.

O represents the wrest or tuning pin block, and *p* represents the hammer-rail.

*q* represents a horizontal rail, on which the posts *r r r*, for hanging the action on, are supported.

*s s s* represent holding-screws passing through the upper ends of the posts *r r r* and screwed into the wrest-pin block *o*, as shown.

*t* represents the frame for supporting the keys on, which frame is made detachable at *t′ t″* from the main case or frame, for the purpose stated.

*u u* represent the treadles in the lower part of the key-board frame. Above the treadles *u u* is secured the foot-guard *v*, provided with projections *v′ v′* of sufficient length to prevent the player's feet from touching or defacing the case of the instrument when the treadles or pedals are operated. Said projections *v′ v′* are secured, as well as the guard *v*, to the case by means of holding-screws *w w*, as shown in Fig. 5.

I wish to secure by Letters Patent, and claim—

1. The herein-described musical-instrument case, consisting of the parts *c c c*, united together so as to form a continuous corrugated frame, as and for the purpose set forth.

2. In combination with the corrugated frame *c c c*, the V-shaped braces *d d d* and perforations *c′ c′ c′*, as and for the purpose set forth.

3. In combination with the case of a musical instrument, the herein-described music-holder, consisting of the open frame *p*, the hinged cover *m*, and receptacle *n*, as and for the purpose set forth.

4. In combination with the pedals *u u* of a musical instrument, the independent or detachable foot guard or protector, consisting of the bar *v*, having projections *v′ v′*, secured to the case of the instrument by means of holding-screws *w w*, as and for the purpose set forth.

In testimony that I claim the foregoing as my own invention I have affixed my signature in the presence of two witnesses.

GEORGE WOODS.

Witnesses:

ÆBAN ANDRÉN,
HENRY CHADBOURN.